United States Patent
Kim et al.

(10) Patent No.: US 7,313,417 B2
(45) Date of Patent: Dec. 25, 2007

(54) TRANSCEIVER FOR A BASE STATION WITH SMART ANTENNA AND A SWITCHED BEAMFORMING METHOD IN DOWNLINK

(75) Inventors: Il-Gyu Kim, Seoul (KR); Hye-Kyung Jwa, Daejeon (KR); Seung-Chan Bang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 298 days.

(21) Appl. No.: 10/977,059

(22) Filed: Oct. 29, 2004

(65) Prior Publication Data

US 2005/0136980 A1    Jun. 23, 2005

(30) Foreign Application Priority Data

Dec. 19, 2003    (KR) .................. 10-2003-0094126
Apr. 19, 2004    (KR) .................. 10-2004-0026722

(51) Int. Cl.
*H04M 1/00*    (2006.01)
*G01S 1/00*    (2006.01)

(52) U.S. Cl. ............... 455/562.1; 455/561; 455/63.4; 455/25; 455/63.1; 342/357.1; 342/367; 342/372; 342/374

(58) Field of Classification Search ........... 455/562.1, 455/561, 63.4, 25, 63.1; 342/357.1, 367, 342/372, 374
See application file for complete search history.

(56) References Cited

U.S. PATENT DOCUMENTS

| | | | |
|---|---|---|---|
| 5,634,199 A | 5/1997 | Gerlach et al. | |
| 6,879,624 B2 * | 4/2005 | Sano | 375/147 |
| 6,888,501 B2 * | 5/2005 | Hirayama et al. | 342/377 |
| 2003/0003890 A1 * | 1/2003 | Tanaka | 455/273 |
| 2003/0228887 A1 * | 12/2003 | Kishigami et al. | 455/561 |
| 2003/0231606 A1 * | 12/2003 | Wu et al. | 370/334 |
| 2004/0005897 A1 * | 1/2004 | Tomoe et al. | 455/450 |
| 2004/0157646 A1 * | 8/2004 | Raleigh et al. | 455/562.1 |
| 2004/0228420 A1 * | 11/2004 | Chul | 375/267 |
| 2005/0101352 A1 * | 5/2005 | Logothetis et al. | 455/562.1 |

FOREIGN PATENT DOCUMENTS

| | | |
|---|---|---|
| KR | 2002-0037635 | 5/2002 |
| KR | 1020020037965 | 5/2002 |
| KR | 2002-0049357 | 6/2002 |

OTHER PUBLICATIONS

"Semi-blind method for transmit antenna array in CDMA systems", J. Choi, et al., IEEE 2000, pp. 189-193.

* cited by examiner

*Primary Examiner*—George Eng
*Assistant Examiner*—Huy Phan
(74) *Attorney, Agent, or Firm*—Blakely Sokoloff Taylor & Zafman (57) ABSTRACT

Disclosed is a transceiver for a base station with a smart antenna having a plurality of antennas. The transceiver comprises: a multipath searching unit for searching multipath delay information for each demodulation channel; a demodulating unit for forming an adaptive beam for each demodulation channel by using the multipath delay information for each demodulation channel for receiving signals and performing demodulation to the received signals and outputting at least one adaptive beam weight vector; a controlling unit for selecting at least one downlink beam index for each channel; and a modulating unit for selecting the downlink switched beams and forming switching beam for modulating signals of each channel and outputting the modulated signals in downlink.

17 Claims, 6 Drawing Sheets

TRANSCEIVER FOR A BASE STATION WITH SMART ANTENNA AND A SWITCHED BEAMFORMING METHOD IN DOWNLINK

CROSS REFERENCE TO RELATED APPLICATION

This application claims priority to and the benefit of Korea Patent Application No. 2003-94126 filed on Dec. 19, 2003 and Application No. 2004-26722 filed on Apr. 19, 2004 in the Korean Intellectual Property Office, the entire content of which is incorporated herein by reference.

BACKGROUND OF THE INVENTION (a) Field of the Invention

The present invention relates to a transceiver for a base station with a smart antenna and a beamforming method in downlink.

More specifically, the present invention relates to a transceiver for a base station with a smart antenna for transferring signals from the base station to a mobile station, and a beamforming method in downlink in a wireless communication system using an antenna array or the smart antenna.

(b) Description of the Related Art

A mobile communication system makes it possible to communicate any kind of data with certain parties anywhere and at any time at all. To perfectly embody the mobile communication system, a next generation mobile communication system is commercialized which works based on a single reference protocol standardized all over the world and makes it possible to provide a far better service.

The next generation mobile communication system transmits and receives video and other data in addition to the speech data being serviced at present. Further, as the services become more varied, the bandwidth of transceiver data uses far wider band than the bandwidth at present. Thus, this would make demand for the mobile communication network increase.

Thus, the main objective of the next generation mobile communication system is to provide a method using as narrow a bandwidth as possible, and reliably transferring more data.

However, there are no known methods satisfying both reduction of the bandwidth and increase of reliability at the same time. Thus, the known methods can not solve both a capacity problem and a reliability problem arising with the next generation mobile communication system.

In recent years, a new method has been actively studied, which can satisfy both increase of capacity in the communication system and improvement of reliability. The new method may restrict interference and noises by controlling beam pattern. The new method is referred to as 'Smart antenna technology', and is one of the main technologies for the next generation mobile communication system.

In the smart antenna method, a base station sets a best suited beam to a subscriber of the wireless communication terminal, and this smart antenna method can reduce radio wave interference, increase capacity of the communication and improve the quality of the communication.

For example, the smart antenna system built at the base station actively meets the speed of targets including 1) a fixed target such as offices, 2) a target moving at low speed such as humans and satellites, and 3) a target moving at fast speed such as vehicles and trains; and continuously provides the best suited beam pattern. The smart antenna system provides best gain to the direction of the target and provides relatively small gain to the other directions to achieve restriction of interference. That is, the smart antenna system may increase capacity of the mobile communication system and improve the communication reliability.

Therefore, the smart antenna will be applied to the next generation communication method such as W-CDMA and CDMA 2000 etc. which are required to transfer many data reliably.

Meanwhile, when the smart antenna is applied to the base station for the wireless communication circumstance, the adaptive beamforming method and switched beamforming method can be considered as methods applicable in downlink or uplink.

The adaptive beamforming method forms a beam by continuously and adaptively changing a beam weight vector in accordance with circumstances where channels are changed.

Figure 1:
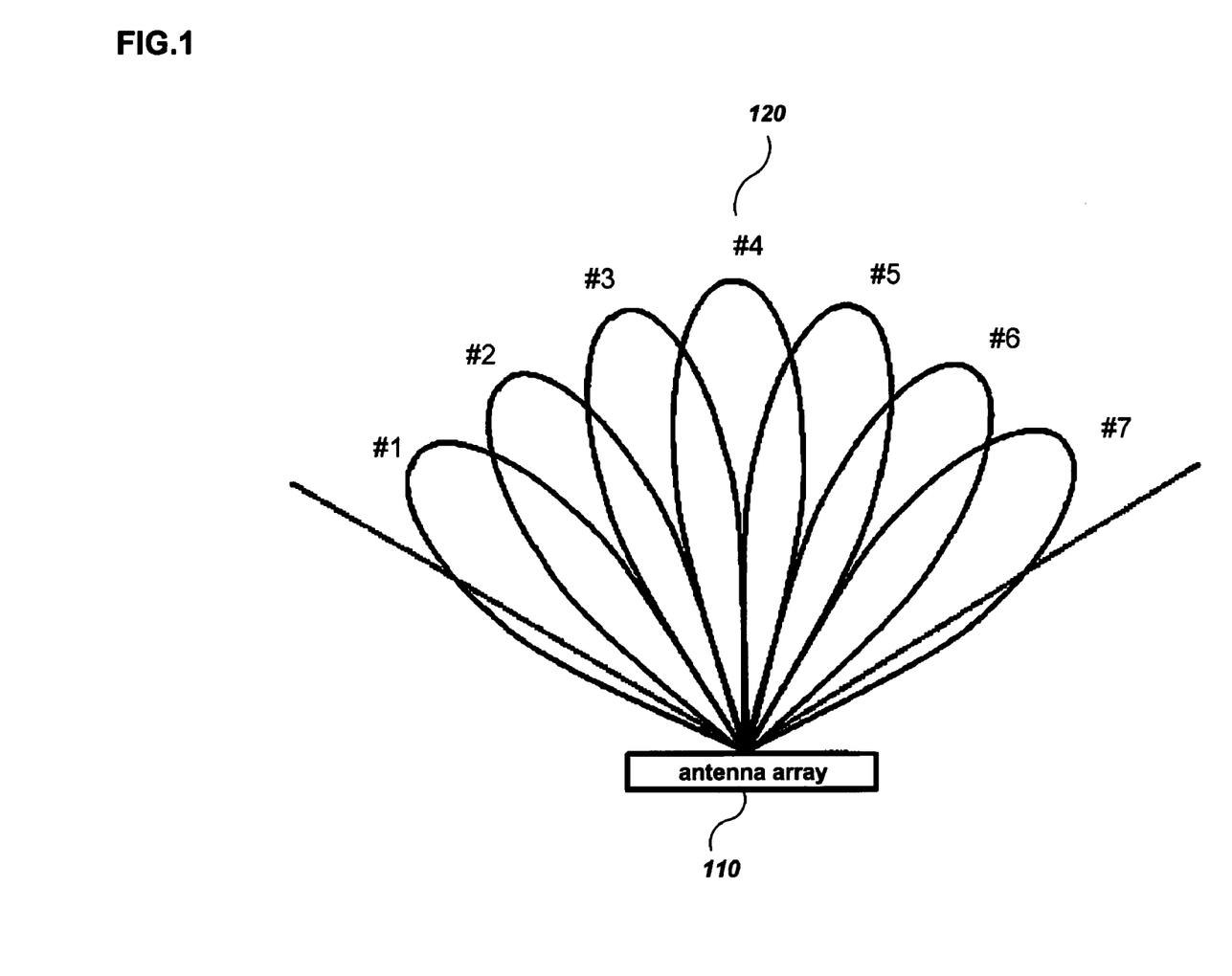
FIG. 1 shows a switched beam pattern in downlink according to the traditional method.

On the other hand, the switched beamforming method has a predetermined number of beams and predetermines the switched beam weight vector. The switched beamforming method changes a switched beam index 120 and forms a beam in accordance with an antenna array direction of the mobile station as shown in FIG. 1. FIG. 1 shows a switched beam pattern in downlink according to the traditional method.

Generally, the adaptive beamforming method is widely used at the uplink base station. However, a time division multiplexing (TDD) method and a frequency division multiplexing (FDD) method are considered to determine the beamforming method. The adaptive beamforming method is widely used, using the uplink adaptive beam weight vector in downlink, when the time division multiplexing (TDD) method is applied, which frequencies are the same in downlink and uplink.

However, since frequencies in downlink and uplink are different in the frequency division multiplexing (FDD) method, the adaptive beam weight vector in uplink can not be applied in downlink. Here, the mobile station measures a channel in downlink and feedbacks the channel information to the base station. Thus, the adaptive beamforming or the switched beamforming methods are used in downlink.

That is, the traditional method receives the feedback information from the terminal and performs beamforming in downlink. In addition, the other method estimates DOA of receiving signals regardless of a demodulator and uses the DOA for beamforming in downlink.

The mentioned method that the mobile station measures the channel information and feedbacks the channel information to the base station and applies the channel information to the beamforming, can be effective, when the characteristics of the channel are good or the speed of the mobile station is low. However, errors can occur at the channel during feedback of the channel information or the performance can fall by feedback delay etc., when the characteristics of the channel are bad or the speed of the mobile station is high.

Further, since the mobile station continuously measures the characteristics of the channel in downlink and feedbacks the characteristics of the channel to the base station, the mobile station may become complicated. Further, since the feedback information is loaded in uplink, the capacity in uplink is reduced.

Figure 2:
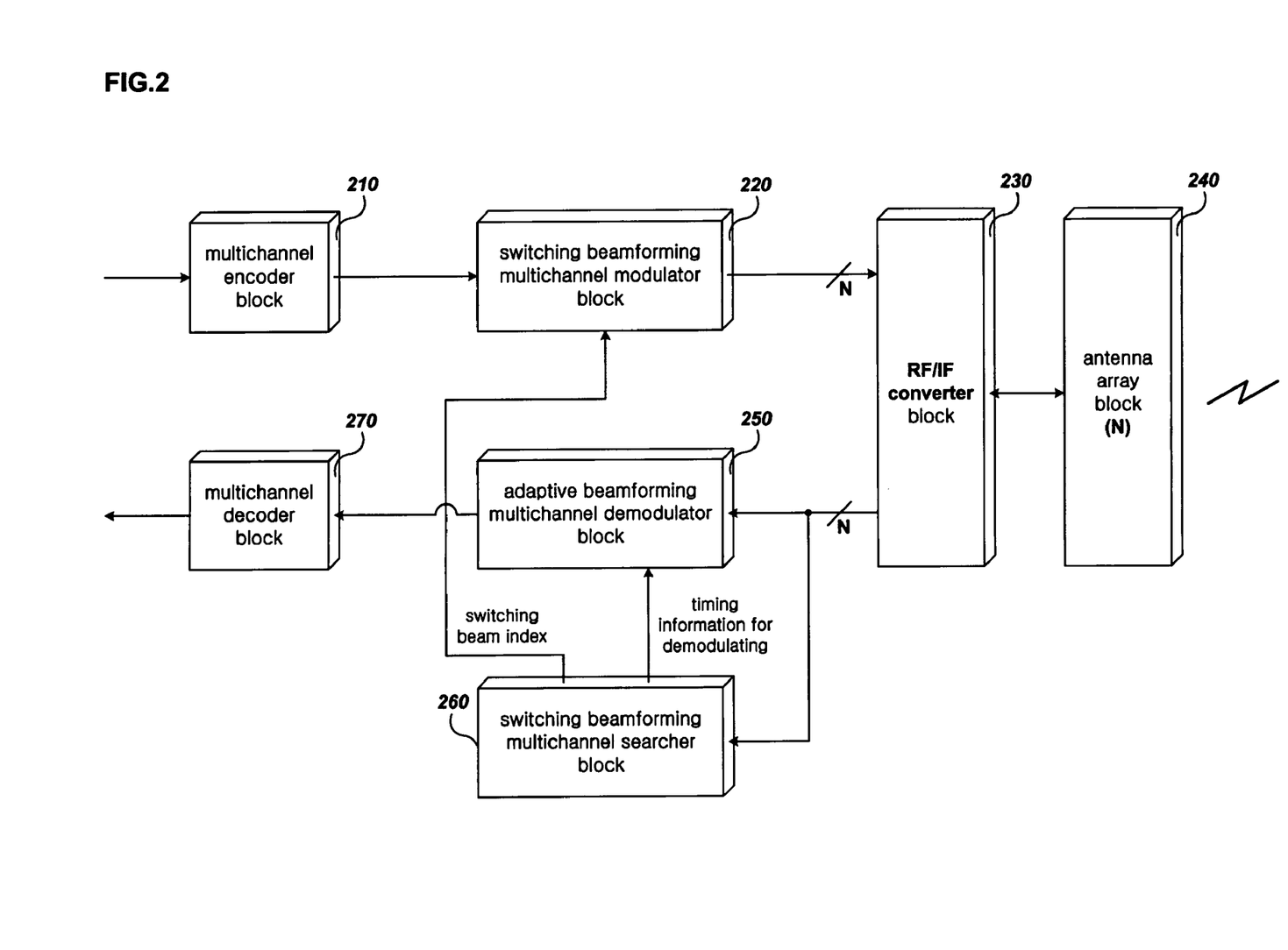
FIG. 2 shows a construction of a transceiver for determining the switched beam index in downlink using the search result by a switching beamforming searcher in uplink according to the traditional method.

Meanwhile, as shown in FIG. 2, there is another method performing the switched beamforming in downlink. FIG. 2 shows a construction of a transceiver for determining the switched beam index in downlink using the search result by a switching beamforming searcher in uplink according to the traditional method. The detailed operation for each block will be described with reference to FIG. 3.

The transceiver of the base station shown in FIG. 2 includes a switching beamforming multi-channel searcher 260. The switching beamforming multichannel searcher selects a beam index of which receiving signal energy is greatest. The beam index is used as a switched beam index in downlink. In the transceiver of the base station, since the switching beamforming multi-channel searcher 260 searches all switched beam patterns, the complexity of the switching beamforming multi-channel searcher 260 increases along the number of the switched beam. For example, when a search range with ½ chip resolution is 64 chips in the W-CDMA mobile communication system, 128 correlators are required for the general searcher. However, 128×12 correlators are required for the switching beamforming multi-channel searcher 260 forming 12 beams.

Meanwhile, the U.S. Pat. No. 5,634,199 (filed in Apr. 17, 1995) discloses an invention entitled "Method of Subspace Beamforming using Adaptive Transmitting Antennas with Feedback". The invention relates to a method for finding channel information in downlink and a method for finding a beamforming weight in downlink in the CDMA mobile communication system.

In detail, according to the U.S. Pat. No. 5,634,199, the base station transmits several probe signals and the terminal finds a correlating matrix for the probe signal and feedbacks the correlating matrix to the base station. Thus, the amount of the feedback data from the mobile station to the base station can be reduced. Then, the base station calculates the beamforming weight in downlink by using the correlating matrixes feedbacked from each terminal. However, since the invention uses the adaptive beamforming method using the feedback information from the mobile station in downlink, the performance can fall, when the characteristics of the channel are bad.

Meanwhile, the Korean patent application No. 2000-67975 (filed in Nov. 16, 2000) discloses the invention entitled "Downlink beamforming system using uplink array response vector and method thereof". The invention provides a downlink beamforming system for forming an antenna beam with maximum gain to the direction the user is located.

In detail, according to the Koran patent application No. 2000-67975, two methods are proposed for forming a beam in downlink by using the received array response vector estimated in uplink. The first method relates to an algorithm that estimates the DOA of receiving signals and forms the maximum antenna gain to a desired user's direction, and the method increases the speed for estimating DOA. The second method estimates the received antenna response vector by using the received array response vector. The transmitting beamforming weight vector can be directly found by multiplying the received antenna response vector by a response conversion matrix. Thus, the antenna beam with maximum gain to the direction the user is located, can be formed. However, the complexity of the base station is not considered in the invention.

Meanwhile, the document entitled "Semi-Blind Method for Transmit Antenna Array in CDMA System" in VTC2000, $1^{st}$ volume, pages 189-194, autumn 2000 discloses a method for finding downlink channel information by using feedback from the terminal and a method for finding beamforming weight downlink by using the downlink channel information, in the CDMA mobile communication system using the FDD method.

In detail, the document discloses a method comprising taking only uplink data, estimating an array response vector from the uplink data, receiving only the fast fading component as feedback from the terminal and calculating a downlink beamforming weight from the fast fading component. Thus, this method can solve the problem of an open loop beamforming method forming the downlink beam by using only uplink data. However, although this method can solve the problem of the pen loop beamforming method to some degree by using the downlink adaptive beamforming method, the complexity of the terminal or the base station can be increased.

SUMMARY OF THE INVENTION

The advantage of the present invention is to provide a transceiver for a base station with a smart antenna and a beamforming method in downlink capable of easily forming a downlink beam by using an inner product of an uplink adaptive beam weight vector and a switched beam weight vector.

Another advantage of the present invention is to provide a transceiver for a base station with a smart antenna and a beamforming method in downlink capable of improving performance in downlink without increasing complexity of a terminal or a base station.

To achieve the advantage, the present invention provides a transceiver for a base station with a smart antenna, comprising: a multipath searching unit for searching multipath delay information for each demodulation channel for signals received through the plurality of antennas; a demodulating unit for forming an adaptive beam for each demodulation channel by using the multipath delay information for each demodulation channel for receiving signals and performing demodulation to the received signals and outputting at least one adaptive beam weight vector for each demodulation channel, the adaptive beam weight vector occurred during demodulation; a controlling unit for selecting at least one downlink beam index for each channel by using correlation of the adaptive beam weight vector and the pre-established plurality of switched beam weight vectors; and a modulating unit for selecting the downlink switched beams corresponding to at least one downlink beam index respectively and forming switching beam for modulating signals of each channel and outputting the modulated signals in downlink.

Here, the demodulating unit comprises a plurality of demodulators, and each demodulator may comprise: a plurality of adaptive beamforming finger blocks; and a combiner for combining the outputs from the plurality of adaptive beamforming finger blocks and outputting the combined outputs to a channel decoder.

Here, the adaptive beamforming finger blocks may comprise: an adaptive beam weight vector operator for real-time extracting the adaptive beam weight vector from the received signals by using the multipath delay information; a multiplier for real-time multiplying the received signals by the outputs from adaptive beam weight vector operator; and a finger for receiving the output from the multiplier and performing dispreading of the DS-CDMA signals by using the multipath delay information, and performing time-tracking, channel estimating, and coherent demodulation, and transferring the demodulated symbol to the combiner and continuously outputting a time averaged energy of the demodulated symbol.

Here, the adaptive beam finger block real-time provides the adaptive beam weight vector outputted from the adaptive weight vector operator and the symbol energy from the finger to the controlling unit.

Here, the controlling unit may comprise: a weight vector table, which switched weight vectors are pre-established in accordance with uplink frequency; an adaptive beam weight vector selector for each channel for selecting at least one adaptive weight vector from the plurality of the adaptive beam weight vectors outputted from the demodulating unit, the selection beginning from the vector with greatest finer energy; a vector inner product and square device for each channel for finding the inner product of the selected adaptive beam weight vector and the switched beam vector of the weight vector table and outputting its squared inner product; and a beam index selector for each channel for selecting a beam index from outputs of the vector inner product and square device and outputting a downlink beam index.

Here, the beam index selector selects the downlink beam index by using at least one adaptive beamforming weight vector $\underline{A}_k$ (k=0,1, ..., K) selected from the adaptive beam weight vector selector for each channel; the switched beamforming weight vectors $\underline{R}_j$ (j=0,1, ..., L) of which number is same with the number of pre-stored switched beams in downlink; and an inner product of vectors such as equation $W_{t,k} = \|\underline{R}_t^H \underline{A}_k\|^2$ (here, the H is an hermitian operator).

Here, an uplink switched beam weight vector producing the same pattern with the downlink beam pattern is used, of which frequency is set in uplink, when an FDD method having different frequencies between the downlink and the uplink is used.

Here, the adaptive beam weight vector selector for each channel selects at least one beam index and uses the beam index as a downlink beam index from squared inner product of the downlink switched beam, the selection beginning from the greatest squared inner product, when the number of the adaptive beam weight vector selected from the adaptive beam weight vector selector for each channel is 1.

Here, the switched beam weight vector table is commonly used for all channels in which the downlink switched beam is formed.

Here, the downlink beam index to any channel is selected based on total receiving energy for each switched beam for the channel.

Here, the modulating unit may comprise: a plurality of modulators for modulating the encoded data for each channel at the base station for transmitting in downlink according to the W-CDMA reference and dispersing the modulated data; a plurality of downlink beam selectors for selecting at least one downlink switched beam by using at least one downlink index for each channel and outputting the signals outputted from the modulators as the selected downlink switched beam; a plurality of adders for each beam for combining each output from the plurality of the downlink beam selectors for each beam; a plurality of downlink switched beam formers for forming each switched beam by using the downlink switched beam weight vector pre-established at each beam; and a plurality of adders for each antenna for combining each output from the plurality of downlink switched beam formers at each antenna and outputs the combination of the output.

Here, each downlink beam selector outputs at least one switched beam and does not output other beams which are not selected.

Meanwhile, another aspect of the present invention provides a transceiver for a base station for forming downlink switched beam in a wireless communication system comprising: a plurality of antenna arrays for providing a beam pattern to a terminal user in downlink or uplink; a RF/IF converter for converting signals transmitting or receiving through the antenna arrays from a wireless frequency band to an immediate frequency band; a multipath searcher for searching multipath delay information for signals received from each channel through the plurality of the antenna arrays; an adaptive beamforming demodulator for forming an adaptive beam for each demodulation channel by using the multipath delay information for each demodulation channel for receiving signals and performing demodulation to the received signals, and outputting adaptive beam weight vectors for each channel, the adaptive beam weight vectors having occurred during demodulation; a downlink beam controller for selecting at least one downlink beam index for each channel by using correlation of the adaptive beam weight vector and the established plurality of switched beam weight vectors; and a switching beamforming modulator for selecting at least one downlink switched beam corresponding to at least one downlink beam index respectively and forming switching beams to the modulating signals for each channel and outputting the modulated signals switching beams in downlink.

Meanwhile, another aspect of the present invention provides a downlink switched beamforming method at a base station with a plurality of antennas comprising: a) searching multipath delay information for each demodulation channel for signals received through the plurality of antennas; b) forming an adaptive beam for each demodulation channel by using the multipath delay information for receiving signals and performing demodulation to the received signals; c) outputting an adaptive beam weight vector for each channel, occurred during demodulation; d) selecting at least one downlink beam index for each channel by using correlation of the adaptive beam weight vector and the established plurality of switched beam weight vectors; and e) selecting downlink switched beams corresponding to at least one downlink beam index respectively and forming switching beams for modulating signals of each channel and outputting the modulated signals in downlink.

Thus, the downlink beamforming method according to the present invention uses the switched beamforming method but the downlink beamforming method calculates correlation value of the adaptive beam weight vector and the plurality of predetermined switched beam weight vector. The downlink beamforming method transmits the downlink signal with at least one switched beam of which correlation values are greatest. The present invention can improve performance in downlink without increasing complexity of the terminal or the receiver of the base station.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Hereinafter, a transceiver for a base station with a smart antenna and a switched beamforming method in downlink are described with reference to the appended drawings.

Figure 3:
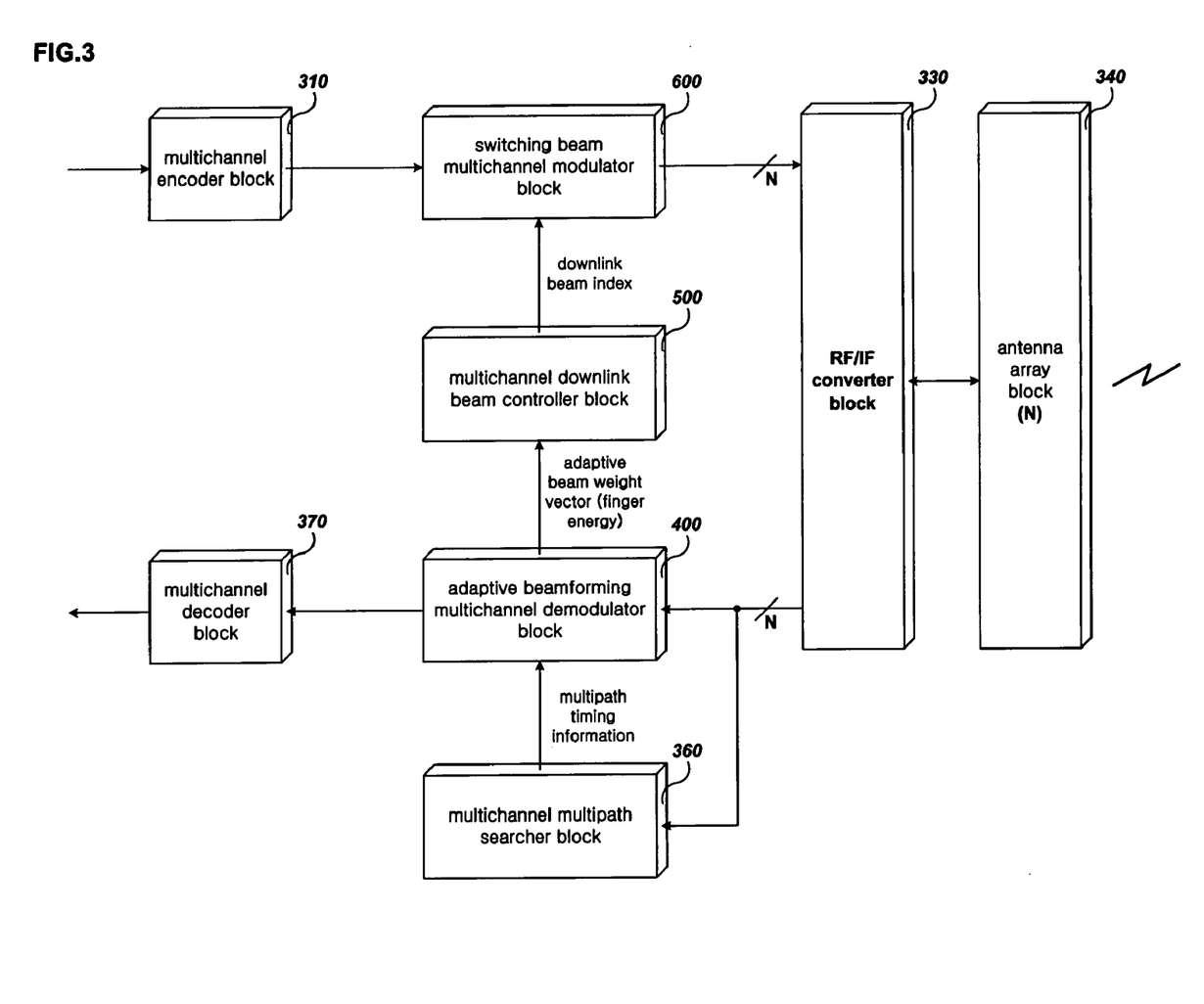
FIG. 3 shows a construction of a transceiver for a base station with multichannel for demodulating signals by forming an adaptive beam and using an adaptive beam weight vector occurred at the demodulation to a switched beamforming in downlink, according to an exemplary embodiment of the present invention.

FIG. 3 shows a construction of a transceiver for a base station with multichannel for demodulating signals by forming an adaptive beam and using an adaptive beam weight vector occurred at the demodulation to a switched beamforming in downlink, according to an exemplary embodiment of the present invention. As shown in FIG. 3, a multichannel downlink beam controller block 500 is located between a modulator block 600 and a demodulator block 400.

As shown in FIG. 3, the transceiver for the base station with a plurality of antennas according to the present invention includes a multichannel encoder block 310, a switching beam multichannel modulator block 600, a radio frequency/intermediated frequency (RF/IF) converter block 330, N antenna arrays 340, a multichannel multipath searcher block 360, an adaptive beamforming multichannel demodulator block 400, a multichannel downlink beam controller block 500, and a multichannel decoder block 370. The downlink switched beamforming apparatus for the base station with polarity antennas according to an exemplary embodiment of the present invention can comprise the multichannel multipath searcher block 360, the adaptive beamforming multichannel demodulator block 400, the multichannel downlink beam controller block 500 and the switching beam multichannel modulator block 600.

As referred to in FIG. 3, the multichannel multipath searcher block 360 selects at least one signal among N signals received through the N antenna arrays 340 and searches multipath delay information for each demodulation channel. Here, the channel means a modulator/demodulator pair instead of a wireless channel, and the M channels are shown in the appended drawing.

The adaptive beamforming multichannel demodulator block 400 forms an adaptive beam for each demodulation channel by using the multipath delay information for receiving signals and performs demodulation to the received signals. The adaptive beamforming multichannel demodulator block 400 outputs at least one adaptive beam weight vector for each demodulation channel. At this time, the adaptive beam weight vector occurs during the demodulation.

Further, the multichannel downlink beam controller block 500 selects at least one downlink beam index for each channel by using correlation of the adaptive beam weight vector and the established plurality of switched beam weight vectors and provides the selected downlink beam index to the switching beam multichannel modulator block 600.

The switching beam multichannel modulator block 600 selects downlink switched beams corresponding to at least one downlink beam index and forms switching beams for modulating signals of each channel and outputs the modulated signals in downlink.

Figure 4:
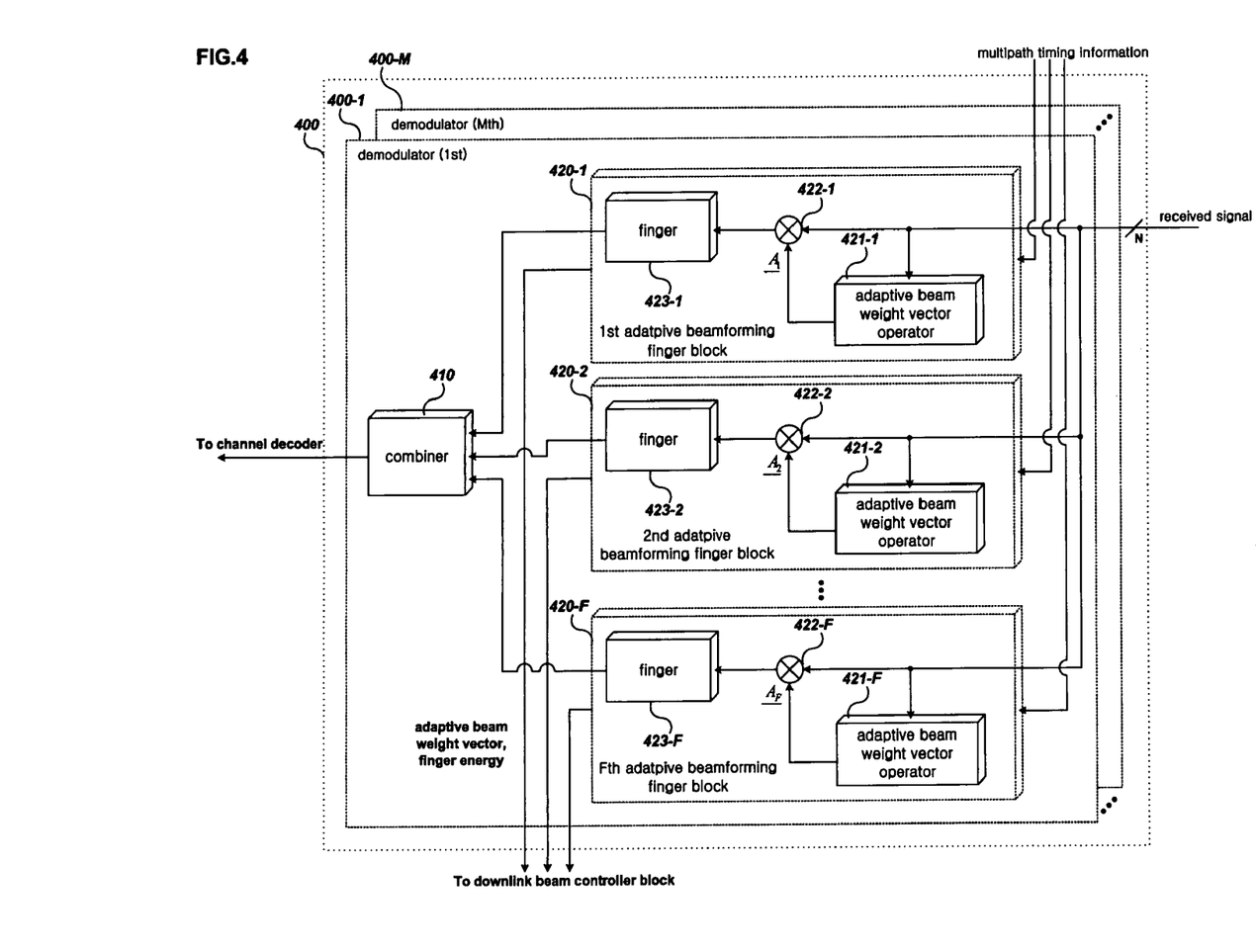
FIG. 4 shows an adaptive beamforming multichannel demodulator block according to an exemplary embodiment of the present invention.

Meanwhile, FIG. 4 shows a DS-CDMA adaptive beamforming multichannel demodulator block using an adaptive beamforming method according to an exemplary embodiment of the present invention. FIG. 4 indicates that adaptive beams are formed from the received signals for each demodulation channel, and adaptive beam weight vectors occurred at the demodulation are outputted for each demodulation channel.

As shown in FIG. 4, the adaptive beamforming multichannel demodulator block 400 of the exemplary embodiment of the present invention includes a plurality of demodulators (400-1~400-M). Each demodulator includes a plurality of adaptive beamforming finger blocks (420-1~420-F) and a combiner 410. The combiner combines outputs from the adaptive beamforming finger blocks and outputs the combined output to a channel decoder.

Here, each adaptive beamforming finger block (420-1~420-F) includes adaptive beam weight vector operators (421-1~421-F) real-time extracting the adaptive beam weight vector from the received signals by using the multipath delay information; multipliers (422-1~422-F) real-time multiplying the received signals by the outputs from the adaptive beam weight vector operator; and fingers (423-1~423-F). The fingers receive the outputs from the multipliers and perform dispreading of the DS-CDMA signals by using the multipath delay information, and perform time-tracking, channel estimating, and coherent demodulation. Also the fingers provide the demodulated symbols to the combiner and output the time averaged energy of the demodulated symbol to the controller.

Here, the adaptive beam finger block real-time provides the adaptive beam weight vector outputted from the adaptive weight vector operator and the symbol energy from the finger to the controller.

Figure 5:
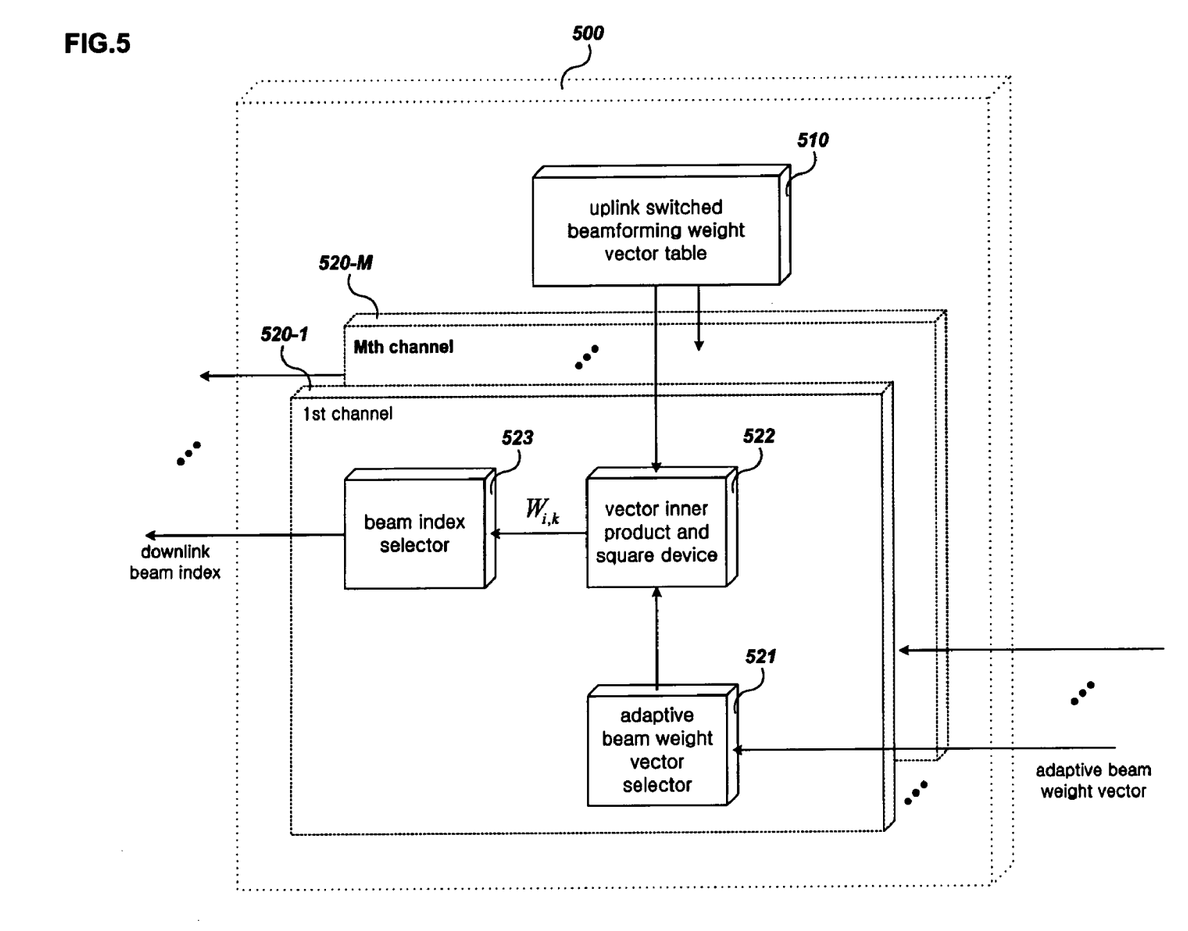
FIG. 5 shows a multichannel downlink beam controller block according to an exemplary embodiment of the present invention.

FIG. 5 shows a multichannel downlink beam controller block according to an exemplary embodiment of the present invention. The multichannel downlink beam controller block 500 can control a total M channels (520-1~520-M) independently at the same time. The multichannel downlink beam controller block 500 comprises an uplink switched beamforming weight vector table 510, an adaptive beam weight vector selector for each channel 521, a vector inner product and square device for each channel 522, and a beam index selector for each channel 523.

The weight vector table 510 pre-established the weight vectors corresponding to forming the switched beam in uplink frequency, and the adaptive beam weight vector selector for each channel 521 selects at least one of the adaptive weight vectors from the plurality of the adaptive beam weight vectors corresponding to the channel outputted from the demodulator block 400. The selection begins from the greatest adaptive beam weight vector.

Further, the vector inner product and square device for each channel 522 finds the inner product of the selected adaptive beam weight vector and the switched beam vector of the weight vector table and outputs its squared inner product. The beam index selector 523 selects at least one beam index from the inner product of vectors and the output from the square device and outputs the downlink beam index.

Figure 6:
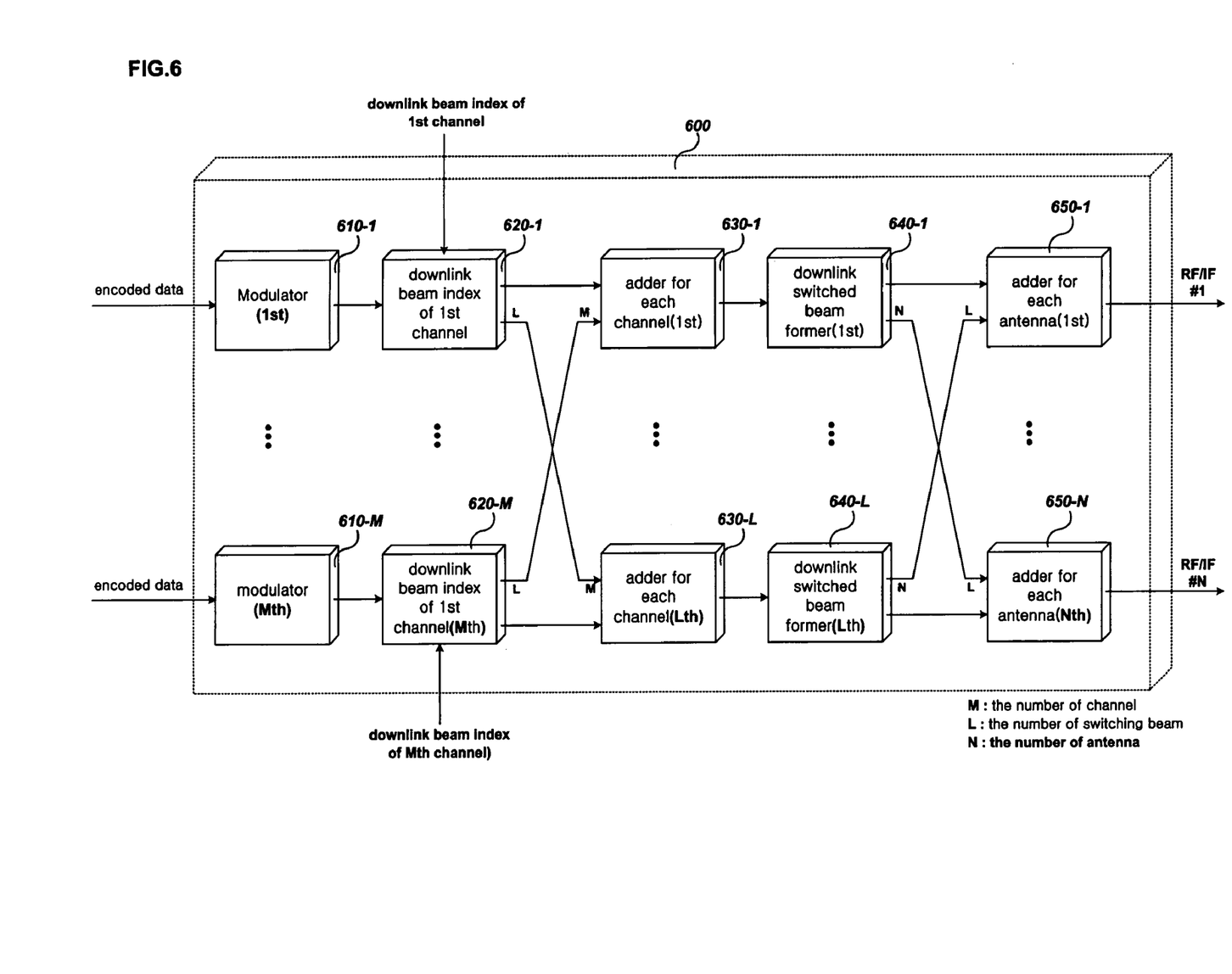
FIG. 6 shows a switched beamforming multichannel modulator block according to an exemplary embodiment of the present invention.

Meanwhile, FIG. 6 shows a switching beamforming multichannel (M channels) modulator block according to an exemplary embodiment of the present invention. The switching beam multichannel modulator block 600 comprises a plurality of modulators (610-1~610-M), downlink beam selectors for each channel (620-1~620-M), a plurality of adders for each beam (the number is L) (630-1~630-L), a plurality of downlink switched beam formers (640-1~640-L), and adders for each antenna (650-1~650-N). The plurality of modulators (610-1~610-M) modulate the encoded data at each channel of the base station and disperse those according to the W-CDMA reference. The downlink beam selectors for each channel (620-1~620-M) select at least one downlink switched beam by using the downlink index and output the signals outputted from the modulators as the selected downlink switched beam. The L adders for each beam (630-1~630-L) combine each output from the plurality of the downlink beam selectors. The plurality of downlink switched beam formers (640-1~640-L) form each switched beam by using the downlink switched beam weight vector pre-established for each beam. The adders for each antenna (650-1~650-N) combine each output from the plurality of downlink switched beam formers and output the result.

Here, the switched beamforming method in downlink according to the exemplary embodiment of the present invention is described with reference to FIGS. 3~6.

First, as shown in FIG. 3, the downlink beam controller block 500 periodically receives at least one uplink adaptive beam weight vector $A_j$(j=1,2, . . . , P) for each channel of communication, from the adaptive beamforming demodulator block 400. The P is same or greater than 1, and the P may be same with the number of the fingers if the exemplary embodiment is applied to the DS-CDMA method. Further, the estimated energies for each finger are provided if the exemplary embodiment is applied to the DS-CDMA method.

Traditionally, a base station for the DS-CDMA mobile communication system includes a plurality of demodulators capable in order to receive signals from a plurality of terminals which the base station provided. Each demodulator includes a plurality of fingers to get diversity gain along multipath of the channel.

At this time, the receiver combines the outputs of the plurality of fingers and achieves diversity gain so that fading effect according to network condition is reduced. For example, the antenna of the base station receives several signals having different transfer delay through multipath. The signals were the same RF signals transmitted from the terminal. The controller of the receiver assigns the different multipath to each finer, and combines the results demodulated at each finger. Thus the controller can achieve the path diversity to improve the performance of the recover.

Further, the receiver of the base station for the CDMA mobile communication system includes an energy estimator for each finger for estimating energy. The common energy estimator calculates the signal energy which the finger took and averages plurality of signal energies and estimates the finger energy based on the average signal energy by using a table for mapping the energy to estimated values.

The adaptive beam weight vectors $A_j$(j=0,1, . . . , P) are the normalized weight vectors which are real-time used for forming the adaptive beams for each finger, when the demodulators demodulate the received signals.

First, as shown in FIG. 4, the demodulator block 400 outputs the adaptive beam weight vector for each finger and the finger energy to the downlink beam controller block 500. The adaptive beam weight vector for each finger and the finger energy is used for demodulating for each channel.

Next, as shown in FIG. 5, the downlink beam controller block 500 receives at least one adaptive weight vector and finger energy for each communication channel from the demodulator block 400. The adaptive beam weight vector selector 521 shown in FIG. 5 selects at least one adaptive weight vector $A_k$(k=0,1, . . . , K) (K≦P . . . The selection begins from the vector with greatest finer energy.

The vector inner product and square device for each channel 522 finds each inner product of the selected K adaptive beam weight vectors $A_k$(k=0,1, . . . , K) and the normalized uplink switched beam vectors $R_j$(j=0,1, . . . , L) of the uplink switched beam weight vector table 510 and outputs its squared inner products. The beam index selector 523 selects at least one downlink beam index by using the L×K inner products squared of vectors and transfers the selected downlink beam index to the modulator block 600 corresponding to the channels 520-1~520-M.

Meanwhile, the following equation 1 shows the inner product squared of the i(i=1,2, . . . , L) th uplink switched beam weight vector and the k(k=1,2, . . . , K) th uplink adaptive beam weight vector. H indicates an hermitian operator.

$$W_{i,k} = \|R_i^H A_k\|^2 \quad \text{[Equation 1]}$$

Further, when the number of the adaptive beam weight vector K is 1, at least one beam index can be selected from the inner products squared of vectors. The selection begins from the greatest one. The beam index can be used as the downlink switched beam index.

Further, the switched beam weight vectors corresponding to the number of the downlink switched beam are commonly used for all modulation channels forming the downlink switched beam.

Here, although the switched beam pattern is used in the downlink, the beam weight vector can be different in accordance with the frequencies, when the frequencies of the downlink and uplink are different, for example in the FDD method. Thus, the L uplink switched beam weight vectors are defined.

That is, when the exemplary embodiment of the present invention performing the switching beamforming in downlink by using the switched beam pattern as shown in FIG. 1 is used as a FDD method, it is more effective to use the uplink switched beam weight vector meeting the uplink frequency producing the same pattern with the downlink beam pattern, than to take direct inner product of the uplink adaptive beam weight vector and the downlink switched weight vector.

In the equation 1, several methods can be suggested for selecting the downlink switched beam index by using the L×K inner products squared of vectors $W_{i,k}$. Here one of the methods is described.

First, a total energy for each switched beam can be defined by the following equation 2.

$$W_i = \sum_{k=1}^{K} e_k W_{i,k}$$ [Equation 2]

Here, the $e_k$ is a demodulation energy of a kth finger, the $W_{t,k}$ means the inner product squared of the uplink switched beam weight vector and the uplink adaptive weight vector as defined in equation 1. Equation 2 means a total energy of K fingers in direction to the ith switched beam.

The beam index selector according to the exemplary embodiment of the present invention calculates $W_t(i=1,2,\ldots,L)$ from equation 2, and selects at least one beam index from the greatest one. The beam index selector transfers the selected beam index to the modulator corresponding to the channel.

As referred to in FIG. 6, the switching beamforming multichannel modulator block 600 receives at least one beam index selected for each channel from the downlink beam controller block 500, and selects at least one downlink switched beam for each channel from the downlink beam selectors (620-1~620-M) in the multichannel modulator block 600 by using the switched index.

Further, the number of output ports of each downlink beam selector (620-1~620-M) is L, and the number of the output ports is same with the number of the downlink beams. The downlink beam selector sends at least one switched beam selected from the L switched beams but does not send others. That is, the output for the other beams not selected is 0.

The L output ports of each downlink beam selector (620-1~620-M) are connected to input ports of each corresponding adders for each beam (630-1~630-L). The adders for each beam (630-1~630-L) receive the total M inputs from each downlink beam selector and combines the M inputs at each beam.

Each downlink switched beamforming unit (640-1~640-L) receives outputs from the L adders for each beam (630-1~630-L) and multiplies the outputs from the adders by the downlink switched beam weight vectors predetermined for each beam.

When the downlink switched beamforming unit (640-1~640-L) performs downlink beamforming, the N (that is, the number of antennas) switched beam-weight vectors for each beam are multiplied by the input signals. Thus the number of the outputs becomes N.

The N outputs for each L downlink switched beamforming unit (640-1~640-L) are combined at the adders for each antenna (650-1~650-N). The combined output is transferred to the RF/IF converter 330 shown in FIG. 3.

Meanwhile, the multichannel downlink beam controller block 500 can be located in the switching beamforming multichannel modulator block 600 or the adaptive beamforming multichannel demodulator block 400.

In conclusion, the downlink beamforming method according to the exemplary embodiment of the present invention uses the switched beamforming method but the downlink beamforming method calculates correlation value of the adaptive beam weight vector and the plurality of predetermined switched beam weight vectors. The adaptive beam weight vector occurs when the signals received from the mobile station are demodulated according to the adaptive beamforming method. The downlink beamforming method transmits the downlink signal with at least one switched beam of which correlation value is greatest.

The traditional methods received the feedback information from the terminal for forming the downlink beam or estimated DOA of receiving signals for forming the downlink beam. However, the exemplary embodiment of the present invention can form the downlink beam without increasing complexity of the terminal or the receiver at the base station.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The present invention can easily form the downlink beam in the wireless system using the antenna array or the smart antenna by using the inner product of the uplink adaptive beam weight vector and the switched beam weight vector.

Further, the present invention can improve the performance of the downlink without increasing complexity of the terminal or the receiver at the base station.

What is claimed is:

1. A transceiver for a base station with a smart antenna having a plurality of antennas, comprising:
    a multipath searching unit for searching multipath delay information for each demodulation channel for signals received through the antennas;
    a demodulating unit for forming an adaptive beam for each demodulation channel by using the multipath delay information for each demodulation channel for receiving signals, performing demodulation to the received signals, and outputting at least one adaptive beam weight vector for each demodulation channel, the adaptive beam weight vector being occurred during demodulation;
    a controlling unit for selecting at least one downlink beam index for each channel by using correlation of the adaptive beam weight vector and pre-established plurality of switched beam weight vectors; and
    a modulating unit for selecting downlink switched beams corresponding to the at least one downlink beam index respectively, forming switching beams for modulating signals of each channel, and outputting the modulated signals in downlink.

2. The transceiver of claim 1, wherein the demodulating unit comprises a plurality of demodulators, and each demodulator comprises:
    a plurality of adaptive beamforming finger blocks; and
    a combiner for combining the outputs from the plurality of adaptive beamforming finger blocks and outputting the combined outputs to a channel decoder.

3. The transceiver claim 2, wherein the plurality of adaptive beamforming finger blocks comprises:
    an adaptive beam weight vector operator for real-time extracting the adaptive beam weight vector from the received signals by using the multipath delay information;
    a multiplier for real-time multiplying the received signals by the outputs from the adaptive beam weight vector operator; and
    a finger for receiving the output from the multiplier, performing dispreading of the DS-CDMA signals by using the multipath delay information, performing time-tracking, channel estimating, and coherent demodulation, transferring the demodulated symbol to the combiner, and continuously outputting a time averaged energy of the demodulated symbol, and the adaptive beam finger block real-time provides the adaptive beam weight vector outputted from the adaptive weight vector operator and the symbol energy from the finger to the controlling unit.

4. The transceiver of claim 1, wherein the controlling unit comprises:
a weight vector table, in which switched beam weight vectors are pre-established in accordance with an uplink frequency;
a per-channel adaptive beam weight vector selector for selecting at least one adaptive weight vector from the plurality of the adaptive beam weight vectors outputted from the demodulating unit, the selection beginning from the vector with greatest finger energy;
a per-channel vector inner product and square device for finding the inner product of the selected adaptive beam weight vector and the switched beam vector of the weight vector table and outputting its squared inner product; and
a per-channel beam index selector for selecting a beam index from outputs of the vector inner product and square device and outputting a downlink beam index.

5. The transceiver of claim 4, wherein the beam index selector calculates squared inner products vectors such as equation $W_{t,k} = \|\underline{R}_t^H \underline{A}_k\|^2$ (here, the H is an hermitian operator) from at least one adaptive beamforming weight vector $\underline{A}_k (k=0,1,\ldots,K)$ selected from the per-channel adaptive beam weight vector selector; and the switched beamforming weight vectors $\underline{R}_j (j=0,1,\ldots,L)$ of which number is same with the number of pre-stored switched beams in downlink; and
selects the downlink beam index by using the squared inner products vectors.

6. The transceiver of claim 4, wherein an uplink switched beam weight vector producing the same pattern with the downlink switched beam pattern, is used, of which frequency is set in uplink, when a FDD (frequency division duplex) method having different frequencies between the downlink and the uplink is used.

7. The transceiver of claim 4, wherein the per-channel adaptive beam weight vector selector selects at least one beam index and uses the beam index as a downlink switched beam index from squared inner product of the downlink switched beam, the selection beginning from the greatest squared inner product, when the number of the adaptive beam weight vector selected from the per-channel adaptive beam weight vector selector is 1.

8. The transceiver of claim 4, wherein the switched beam weight vector table is commonly used for the channels in which the downlink switched beam is formed.

9. The transceiver of claim 4, wherein the downlink beam index to any channel is selected based on total receiving energy for each switched beam for the channel.

10. The transceiver of claim 1, wherein the modulating unit comprises:
a plurality of modulators for modulating the encoded data for each channel at the base station for downlink transmission according to the W-CDMA reference and dispersing the modulated data;
a plurality of per-channel downlink beam selectors for selecting at least one downlink switched beam by using at least one downlink index for each channel, and outputting the signals outputted from the modulators as the selected downlink switched beam;
a plurality of per-beam adders for adding each output from the plurality of the downlink beam selectors for each beam;
a plurality of downlink switched beam formers for forming each switched beam by using the downlink switched beam weight vector pre-established at each beam; and
a plurality of per-antenna adders for adding each output from the plurality of downlink switched beam formers at each antenna and outputting the added output.

11. The transceiver of claim 10, wherein each downlink beam selector outputs at least one switched beam and does not output other beams which are not selected.

12. The transceiver for a base station for forming downlink switched beam in a wireless communication system comprising:
a plurality of array antennas for providing a beam pattern to a terminal user in downlink or uplink;
an RF/IF converter for converting signals transmitting or receiving through the array antennas from a radio frequency band to an immediate frequency band;
a multipath searcher for searching a multipath delay information for signals received from each channel through the array antenna;
an adaptive beamforming demodulator for forming an adaptive beam for each demodulation channel for receiving signals by using the multipath delay information for each demodulation channel and performing demodulation to the received signals, and outputting the adaptive beam weight vector for each channel, the adaptive beam weight vector being occurred during demodulation;
a downlink beam controller for selecting at least one downlink beam index for each channel by using correlation of the adaptive beam weight vector and established plurality of switched beam weight vectors; and
a switching beamforming modulator for selecting at least one downlink switched beam corresponding to the at least downlink beam index respectively, forming switching beams to the modulating signals for each channel, and outputting the modulated signals in downlink.

13. A downlink switched beamforming method at a base station with a plurality of antennas comprising:
a) searching multipath delay information on signals received through the antennas for each demodulation channel;
b) forming an adaptive beam for receiving signals for each demodulation channel by using the multipath delay information, and performing demodulation to the received signals;
c) outputting an adaptive beam weight vector for each channel, occurred during demodulation;
d) selecting at least one downlink beam index for each channel by using correlation of the adaptive beam weight vector and established plurality of switched beam weight vectors; and
e) selecting downlink switched beams corresponding to the at least one downlink beam index respectively, forming switching beams for modulating signals of each channel, and outputting the modulated signals in downlink.

14. The downlink switched beamforming method of claim 13, wherein in the stage d), squared inner products vectors such as equation $W_{t,k} = \|\underline{R}_t^H \underline{A}_k\|^2$ (here, the H is an hermitian operator) is calculated from at least one adaptive beamforming weight vector $\underline{A}_k (k=0,1,\ldots,K)$ selected from the per-channel adaptive beam weight vector selector; and the switched beamforming weight vectors $\underline{R}_j (j=0,1,\ldots,L)$ of which number is same with the number of pre-stored switched beams in downlink; and the downlink beam index is selected by using the squared inner products vectors.

15. The downlink switched beamforming method of claim 13, wherein in the stage d), the uplink switched beam weight vector is used, the uplink switched beam weight vector forming the same pattern with the downlink beam pattern, of which frequency in uplink is set with the switched beamforming weight vector, when frequency in downlink is different from the frequency in uplink.

16. The downlink switched beamforming method of claim 13, wherein in the stage d), at least one beam index is selected from the squared inner product of the downlink switched beam and used as a downlink beam index, the selection being made the greatest squared inner product as reference when the number of the adaptive beam weight vector is 1.

17. The downlink switched beamforming method of claim 13, wherein in the stage d), the downlink beam index is selected based on total receiving energy for each switched beam.

* * * * *